US012134094B2

(12) United States Patent
Bennett et al.

(10) Patent No.: US 12,134,094 B2
(45) Date of Patent: Nov. 5, 2024

(54) INTERFACE FOR A MICROFLUIDIC DEVICE

(71) Applicant: QUANTUMDX GROUP LIMITED, Tyne and Wear (GB)

(72) Inventors: James Bennett, Tyne and Wear (GB); Neil Litten, Sonning (GB); Richard Smith, Gamlingay (GB); Julian Brandon-Jones, Whittlesford (GB)

(73) Assignee: QUANTUMDX GROUP LIMITED, Newcastle Upon Tyne (GB)

( * ) Notice: Subject to any disclaimer, the term of this patent is extended or adjusted under 35 U.S.C. 154(b) by 564 days.

(21) Appl. No.: 17/593,171

(22) PCT Filed: Mar. 9, 2020

(86) PCT No.: PCT/GB2020/050555

§ 371 (c)(1),
(2) Date: Sep. 10, 2021

(87) PCT Pub. No.: WO2020/183142

PCT Pub. Date: Sep. 17, 2020

(65) Prior Publication Data

US 2022/0184616 A1 Jun. 16, 2022

(30) Foreign Application Priority Data

Mar. 12, 2019 (GB) ..................................... 1903402

(51) Int. Cl.
*B01L 3/00* (2006.01)

(52) U.S. Cl.
CPC ... *B01L 3/502715* (2013.01); *B01L 2200/141* (2013.01); *B01L 2300/0672* (2013.01);
(Continued)

(58) Field of Classification Search
CPC ......... B01L 2200/027; B01L 2200/141; B01L 2300/0672; B01L 2300/0816;
(Continued)

(56) References Cited

U.S. PATENT DOCUMENTS 4,861,335 A 8/1989 Reynolds
5,638,828 A 6/1997 Lauks
(Continued)

FOREIGN PATENT DOCUMENTS

DE 10311731 A1 10/2003
EP 2606872 A1 * 6/2013 ................ A61J 1/10
WO WO 2018/060421 A1 4/2018

OTHER PUBLICATIONS

International Search Report and Written Opinion mailed on Aug. 4, 2020 in International Application No. PCT/GB2020/050555.
(Continued)

*Primary Examiner* — Jennifer Wecker
(74) *Attorney, Agent, or Firm* — Knobbe, Martens, Olson & Bear, LLP

(57) ABSTRACT

An interface for a microfluidic device such as a microfluidic cassette has a seal portion moveable from a first position to a second position within a reservoir in response to an applied force. Movement of the seal portion within the reservoir causes the volume of the reservoir to increase. The interface also has a hollow needle with a first end and a second end, the first end locatable in fluid communication with the reservoir and the second end located outside of the reservoir and arranged for piercing. The seal portion and the needle are arranged such that when the seal portion moves from the first position to the second position, a predetermined volume of fluid is drawn through the needle into the reservoir.

19 Claims, 6 Drawing Sheets

(52) U.S. Cl.
CPC .................. *B01L 2300/0832* (2013.01); *B01L 2400/0478* (2013.01)

(58) Field of Classification Search
CPC ..... B01L 2300/0832; B01L 2400/0478; B01L 3/502715
See application file for complete search history.

(56) References Cited

U.S. PATENT DOCUMENTS

| | | | |
|---|---|---|---|
| 5,964,735 | A | 10/1999 | Alexander |
| 2007/0048194 | A1 | 3/2007 | Schulein |
| 2012/0316467 | A1 | 12/2012 | Kolb |

OTHER PUBLICATIONS

Office Action issued on Nov. 29, 2023 for Japanese Application No. JP 2021-555008, 9 pages.

* cited by examiner

INTERFACE FOR A MICROFLUIDIC DEVICE

PRIORITY AND CROSS REFERENCE TO RELATED APPLICATIONS

This application is the U.S. National Phase Application under 35 U.S.C. § 371 of International Application No. PCT/GB2020/050555, filed Mar. 9, 2020, designating the U.S. and published in English as WO 2020/183142 A1 on Sep. 17, 2020, which claims the benefit of Great Britain Application No. GB 1903402.4, filed Mar. 12, 2019. Any and all applications for which a foreign or a domestic priority is claimed are identified in the Application Data Sheet filed herewith and are hereby incorporated by reference in their entireties under 37 C.F.R. § 1.57.

FIELD

The present invention relates to an interface for a microfluidic device such as a microfluidic cassette. The present invention also relates to a microfluidic cassette comprising an interface.

BACKGROUND

When microfluidic diagnostic testing is performed on a biological specimen, the specimen typically undergoes one or more processing steps before it is transferred into a microfluidic cassette for testing.

Current techniques for processing a specimen and for transferring the specimen into a microfluidic cassette are performed manually by a user. First the user collects a biological specimen (typically as a fluid or via a swab). The user then adds the specimen into a vessel such as a test tube and mixes the specimen with one or more specimen processing fluids. Finally, the user manually draws a volume of fluid from the vessel using a device such as a pipette and transfers this fluid into an open region of a microfluidic cassette.

There are various disadvantages associated with techniques of this type. Notably, they are prone to user error when a user incorrectly measures the amount of fluid introduced into the cassette or inadvertently “double doses” the cassette with two quantities of fluid. This can be a particular problem with microfluidic testing because even small differences in the amount of fluid introduced into a cassette can have a large impact on the accuracy of diagnostic tests that are performed on the fluid.

Furthermore, such techniques typically require access to specialist equipment and specially trained users and even when correct protocols are followed, there is potential for contamination of the fluid, particularly when the cassette is open to the local environment.

These disadvantages make such techniques potentially unsuited to point of care settings and particularly to point of care settings in parts of the developing world with limited access to specialist equipment and specially trained users and where, conversely, there is often a particular need to provide accurate and low-cost diagnostic testing.

The present invention aims to obviate or mitigate one or more of these disadvantages.

SUMMARY

According to a first aspect of the present invention, there is provided an interface for a microfluidic device such as a microfluidic cassette. The interface comprises a seal portion moveable from a first position to a second position within a reservoir in response to an applied force. Movement of the seal portion within the reservoir causes the volume of said reservoir to increase. The interface also comprises a hollow needle comprising a first end and a second end, said first end locatable in fluid communication with the reservoir and said second end located outside of the reservoir and arranged for piercing. The seal portion and the needle are arranged such that when the seal portion moves from the first position to the second position, a predetermined volume of fluid is drawn through the needle into the reservoir.

Advantageously, this arrangement provides an effective, quick and convenient means of drawing fluid from a container for introducing into a microfluidic device such as a microfluidic cassette. A predetermined volume of fluid can be drawn in an accurate and reliable manner. This arrangement reduces potential user error arising when a user measures fluid manually. Drawing an accurate and reliable amount of fluid can also improve the accuracy of diagnostic tests performed on the fluid. The interface is particularly suited to remote point of care applications because specialist equipment or training is not required. The interface can be used with existing microfluidic cassettes with minimal modification of such cassettes. In some embodiments for example, the interface may be a separate sub-assembly that can be attached to an existing microfluidic cassette with minimal modifications. In other embodiments that cassette can have the interface integrated therein.

Optionally, the interface further comprises a seal actuating member arranged to move the seal portion from the first position to the second position within the reservoir.

Advantageously, an effective means for applying mechanical force to move the seal portion is provided. The seal actuating member may be a needle guard.

Optionally, the seal actuating member is arranged to move the seal portion from the first position to the second position in response to a force applied to the seal actuating member by a fluid container.

Advantageously, the act of bringing a fluid container in contact with the interface can actuate (i.e. move) the seal portion. This “automatic” actuation can further improve usability of the interface and reduce the likelihood of user error as all processes carried out by the user are driven in a singular motion and direction to dispense the fluid.

Optionally, the needle is secured to the seal actuating member such that the needle moves with the seal actuating member.

Optionally, the seal actuating member is formed integrally with the needle carrier.

Optionally, the interface further comprises at least one arm portion moveable between a first position and a second position, wherein in the first position the arm portion prevents movement of the seal actuating member in a direction that causes movement of the seal portion from the first position to the second position.

Optionally, in the second position the arm portion does not prevent movement of the seal actuating member in a direction that causes movement of the seal portion from the first position to the second position.

Advantageously, this can prevent the seal portion from being accidentally actuated by a user.

Optionally, the arm portion is mechanically biased towards the first position.

Optionally, the arm portion comprises at least one abutment surface arranged to interact with a surface of the seal actuating member in the first position.

Optionally, the arm portion comprises at least one surface arranged to interact with a surface of a fluid container to move the arm portion from the first position to the second position.

Advantageously, the arm portion can hold the seal actuating member in the first position until contact is made with a suitably shaped object such as a fluid container.

Optionally, the interface further comprises a housing moveable between a first position and a second position, wherein in the first position the second end of the needle is enclosed by the housing and in the second position the second end of the needle extends out of the housing.

Advantageously, this can improve safety by covering the needle in the first position and thereby preventing a user from contacting the needle.

Optionally, the housing comprises a housing seal portion wherein, in the first position the needle is within, or below, the housing seal portion and wherein in the second position, the needle extends through the housing seal portion out of the housing.

Advantageously, this can provide an effective way of moving the needle through the housing. The seal can prevent fluid from escaping from the needle when the needle is in the first position. The seal can also remove some contaminants from the needle as the needle moves through the seal. This can improve the quality of the specimen.

Optionally the housing seal portion is a re-pierceable membrane.

Optionally, the housing has a first configuration in which movement of the housing from the first position to the second position is prevented and second configuration in which movement of the housing from the first position to the second position is not prevented.

Optionally, the housing is mechanically biased towards the first configuration.

Advantageously, this can further improve safety by only exposing needle when a suitably shaped object, such as a specimen or fluid container, interacts with the housing even if user presses down on the housing.

Optionally, the housing comprises at least one surface arranged to interact with a surface of a fluid container to move the housing from the first configuration to the second configuration.

Most preferably, the at least one surface is arranged to co-axially align with a surface of a fluid container to move the housing from the first configuration to the second configuration.

Optionally, the interface further comprises an outer housing enclosing the interface.

Advantageously, this encloses and protects components of interface and prevents a user from interfering with the components.

Optionally, the outer housing or shroud restricts the movement of the seal actuating member in a direction away from the microfluidic cassette and is moveable from a first shroud position to a second shroud position, wherein in the second shroud position the movement of the seal actuating member in a direction away from the microfluidic device is such that, whilst some upwards movement is allowed, it is restricted from returning to its starting position.

Advantageously as the outer housing or shroud is lower when in the second position, where it becomes latched or fixed, this allows the seal actuating member to be moved back upwards to a position whereby the needle is enclosed, or not protruding upwards through the seal, but not to move significantly upwards beyond that point.

Preferably, after the seal actuating member is moved in a direction away from the microfluidic device when the outer housing is in the second shroud position it cannot then be moved downwards again.

Advantageously, this prevents a user accidentally introducing more than one dose of fluid into a cassette. This also prevents the needle from being re-exposed.

Optionally, the outer housing is arranged to move from the first position to the second position on contact with a suitable surface, for example of a fluid container.

Optionally, the interface is securable to or integrally formed with a microfluidic cassette.

Optionally, the interface further comprises a reservoir.

According to a second aspect of the present invention, there is provided a microfluidic cassette comprising an interface according to the first aspect.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1A:
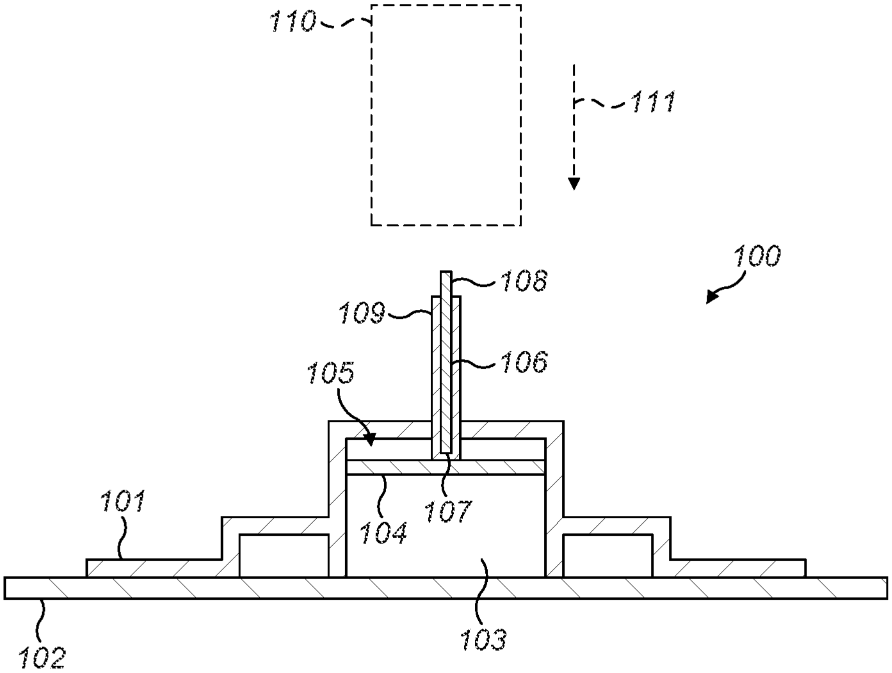
FIG. 1*a* provides a schematic cross section of an interface in a first configuration according to certain embodiments of the present invention.
Figure 1B:
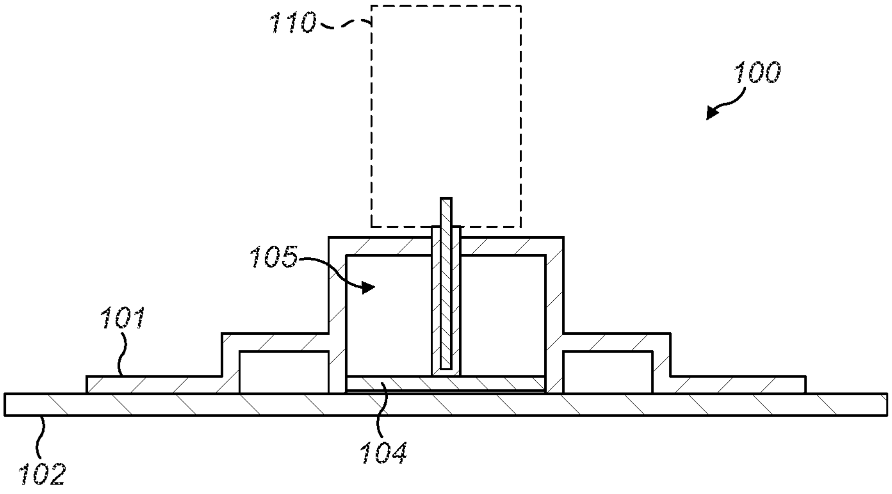
FIG. 1*b* provides a schematic cross section of the interface of FIG. 1*a* in a second configuration according to certain embodiments of the present invention.

FIGS. 1*a* and 1*b* show an interface 100 according to certain embodiments of the invention. In this embodiment many of the safety features are not shown. In FIG. 1*a*, a seal portion 104 of the interface 100 is in a first position and in FIG. 1*b* the seal portion 104 is in a second position.

The interface 100 includes a base 101. The base 101 is secured to a surface of a microfluidic cassette 102. The base 101 is shaped such that it includes a space 103. It would be understood that in other embodiments the base 101 could be integrally formed with a microfluidic cassette. It would also be understood that, where the interface is attached to a microfluidic cassette, assembly of the interface could be carried out by features being attached from either side of the cassette or from one side of the cassette only.

The interface 100 includes a seal portion 104. The seal portion 104 is located within the space 103. The seal portion 104 forms a fluid tight seal within the space 103. The seal portion 104 seals a region of the space 103 defining a reservoir 105.

The seal portion 104 is moveable within the space 103 between a first position and a second position when an external mechanical force is applied to the seal portion 104. In this embodiment, the external force is transmitted via a seal actuating member 109 or needle carrier. It would however be understood that the external force could be applied to the needle.

As shown in FIGS. 1*a* and 1*b*, the reservoir 105 has a smaller volume in the first position (FIG. 1*a*) than in the second position (FIG. 1*b*). In certain embodiments, the reservoir 105 has substantially close to zero volume in the first position, i.e. the reservoir volume is predominantly only the volume of the needle and needle pathway.

The interface 100 also includes a hollow needle 106. The needle 106 includes a first end 107 and a second end 108. A fluid communication passageway is formed within the needle such that fluid can move between the first end 107 and the second end 108. The needle 106 is mechanically resilient, with the needle guard being held in a position, such that the second end 108 can be used to pierce objects. The needle also comprises an aperture at the first end such that the fluid communication passageway of the needle is itself in fluid communication with the reservoir 105.

The first end 107 of the needle is located in fluid communication with the reservoir 105. The second end 108 of the needle extends out of the reservoir 105. The second end 108 is arranged to be in fluid communication with a pierced object such as a fluid (specimen) container.

The interface 100 includes a seal actuating member 109. The seal actuating member 109 includes a body comprising a first end that is secured to the seal portion 104 and a second end located outside of the reservoir 105 adjacent to the second end 108 of the needle 106.

The seal actuating member 109 is arranged to actuate (i.e. move) the seal portion 104 when a mechanical force is applied. Typically, the mechanical force is applied to the seal actuating member 109 as a user brings a fluid container in contact with the seal actuating member 109 (or other components to which the seal actuating member 109 is mechanically associated).

The needle 106 is secured to the seal actuating member 109 such that the needle 106 moves with the seal actuating member 109. The needle 106 is partially enclosed by the seal actuating member 109. The second end 108 of the needle extends out of the seal actuating member 109. The seal actuating member 109 is also referred to herein as a needle carrier.

Prior to use, the seal portion 104 is located in the first position (as shown in FIG. 1*a*). A user brings a pierceable surface of a fluid container 110 towards the interface 100 in the direction denoted by dashed arrow 111 (i.e. towards the base 102). In certain embodiments, the pierceable surface of the fluid container 110 comprises a seal that can be pierced and closed a number of times i.e. a re-pierceable seal.

In the preferred embodiment the fluid container 110 comprises a re-pierceable portion. The fluid container 110 contacts and is pierced by the second end 108 of the needle 106. After piercing, the second end 108 of the needle 106 is in fluid communication with inside of the fluid container 110.

The user continues to move the fluid container 110 in the direction denoted by dashed arrow 111. The fluid container 110 contacts a surface of, and begins to move, the seal actuating member 109. Because the seal actuating member 109 is secured to, or is integrally formed with, the seal portion 104, movement of the seal actuating member 109 causes corresponding movement of the seal portion 104 in a direction from the first position to the second position.

As the seal portion 104 moves between the first and second position, the volume of the reservoir 105 increases. This causes fluid inside the fluid container 110 to be drawn through the needle 106 into the reservoir 105.

The user continues to move the fluid container 110 in the direction denoted by dashed arrow 111 until the seal portion 104 reaches the second position (shown in FIG. 1*b*) in which further movement of the seal portion 104 is not possible.

At this point, a predetermined volume of fluid has been drawn from the fluid container 110 through the needle 106 into the reservoir 105. The predetermined volume corresponds to the change in volume of the reservoir 105 between the first and second positions.

It would be understood that the space 103 can be sized appropriately to result in a preferred size of reservoir 105.

The user then removes the fluid container 110 from the interface 100 by moving the fluid container 110 in the opposite direction (i.e. away from the base 101).

In a preferred embodiment, the seal actuating member 109 is adapted to latch to restrict secondary dosing via the interface 100.

Figure 2A:
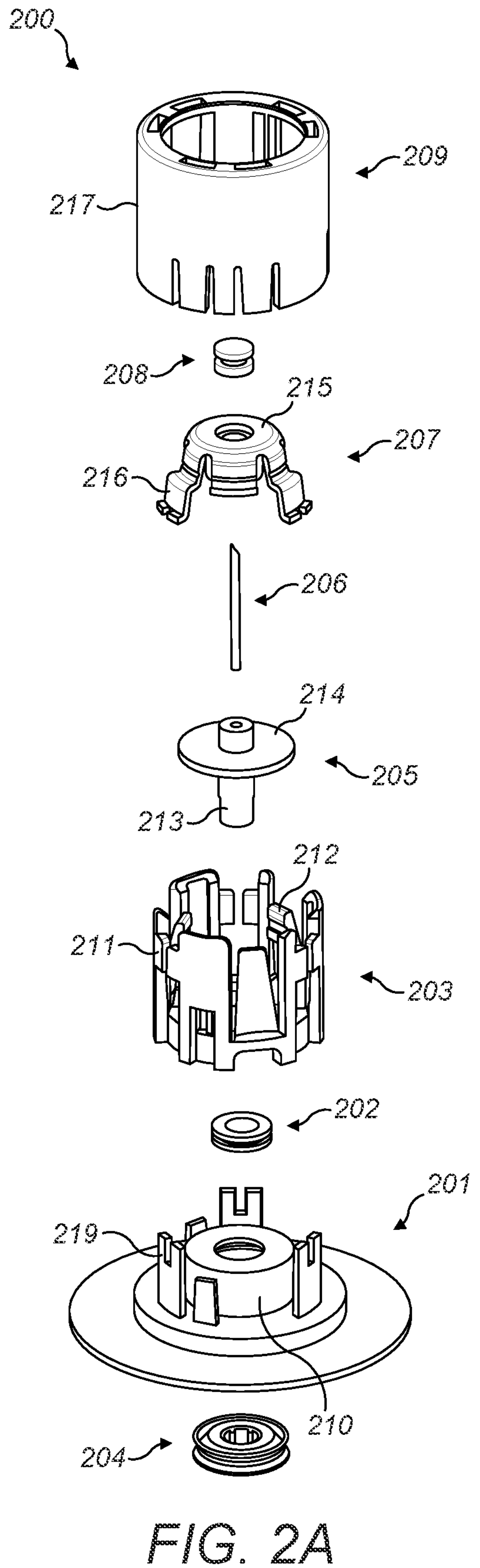
FIG. 2A provides an exploded diagram of an interface according to certain embodiments of the present invention.
Figure 2B:
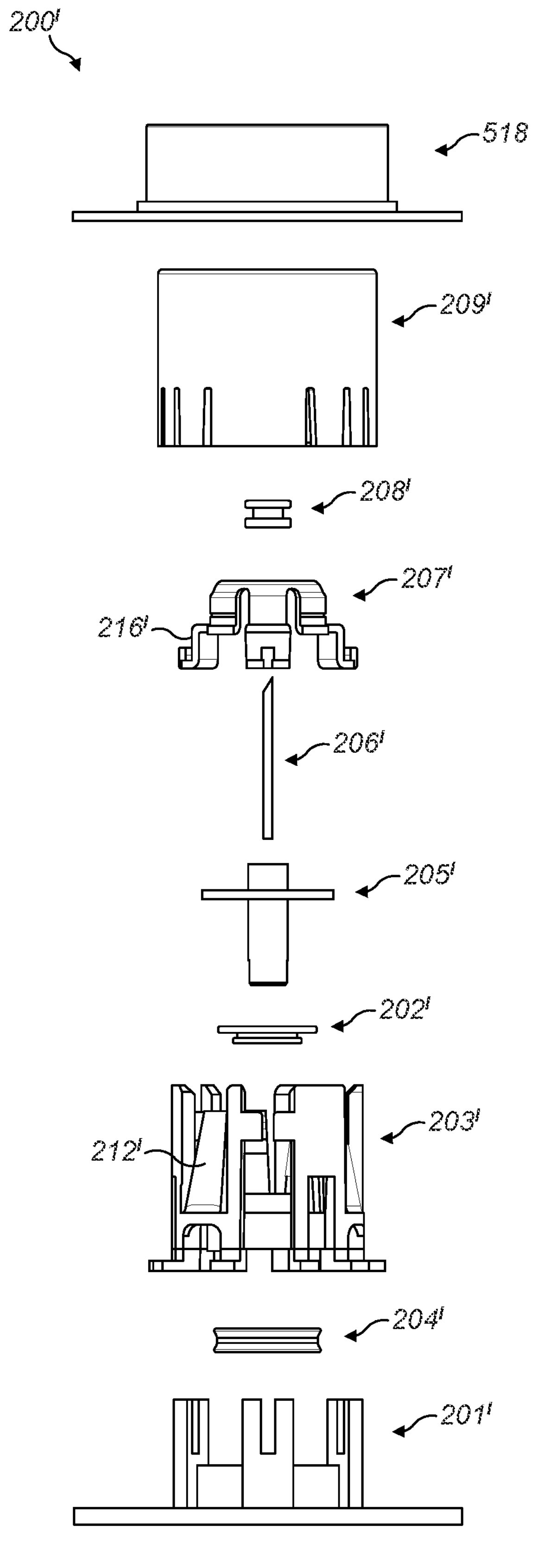
FIG. 2B provides an exploded diagram of an interface according to another embodiment of the present invention, where the features are as in FIG. 2A but assembly is not required to occur on either side of a cassette.

FIG. 2A provides an exploded diagram of an interface 200 according to certain preferred embodiments of the present invention. FIG. 2B provides an alternative embodiment where the features are substantially the same, however the interface of 2B can be assembled from a single side of a microfluidic cassette as it is provided with an upper casing 518 that can be placed over the whole assembly 200', c.f. the assembly of the interface 200 in FIG. 2A which requires the base 201 to be position on one side of the cassette and the remaining interface features to be attached thereto from the other side.

The interface 200 includes a base 201, an overmould 202, a body 203, a seal portion 204, a needle carrier 205, a hollow needle 206, a needle guard 207, a housing seal portion 208, and a shroud 209.

In this embodiment, the base 201, seal portion 204, needle carrier (referred to with reference to FIG. 1 as a seal actuating member) 205 and needle 206 have corresponding structural and functional characteristics as the corresponding parts described with reference to FIGS. 1*a* and 1*b* except where otherwise described.

The base 201 includes a plurality of securing portions including first securing portion 210. In certain embodiments, the base 201 includes three securing portions. The securing portions are shaped to interact with the body 203 to secure the body 203 to the base 201. As described with reference to FIGS. 1*a* and 1*b*, the base 201 also includes an interior space that, together with the seal portion 204, defines a reservoir. During assembly of a microfluidic cassette, the base can be introduced via the underside of the cassette and the body attached from the other side of said cassette. However, in other embodiments the interface can be assembled with the cassette all from one side.

The overmould 202 includes a cylindrical body including a central hole extending partially through the body. The overmould 202 is arranged to be located within the reservoir between the seal portion 204 and the base 201. The hole is shaped to receive an end of the needle guard 205. The overmould 202 is composed of an elastic material such as rubber. The overmould 202 acts to seal the reservoir even during the moving translation of the fluid between the needle guard 205 and the base and also prevent fluid returning or leaking to ensure an accurate metered volume is obtained.

The body 203 includes a housing 211. The housing 211 includes an annular wall. An inner surface of the annular wall is shaped to interact with the securing portions 210 of the base 201 to secure the body 203 to the base 201. An outer surface of the annular wall is shaped to interact with the shroud 209 as described in more detail below.

The body 203 includes a plurality of arm portions making up part of the annular wall of the housing 211 including first arm portion 212. In certain embodiments, the body 203 includes three arm portions. The body 203 has a first configuration and a second configuration. In the first configuration, the arm portions e.g. 212 are located in a first position, and in the second configuration, the arm portions are located in a second position. The arm portions are mechanically biased towards the first position and are moveable towards the second position.

In the first position, which is shown in FIG. 2, the ends of the arm portions furthest from the base 201 extend inwardly with respect to the annular wall (that is, towards the longitudinal axis of the housing 211). In the second position, which is described in more detail with reference to FIG. 4, the arm portions are displaced away from the longitudinal axis of the housing 211 relative to the first position such that they extend substantially parallel with the rest of the annular wall of the housing or extend outwardly from the annular wall.

The arm portions include an abutment surface adjacent to the end furthest from the base 201. The abutment surface is shaped to contact (and thereby interact with) a surface of the needle carrier 205 when the arm portions are in the first position.

The arm portions include a further surface adjacent to the end furthest from the base 201. This surface is arranged to interact with a surface of a fluid container to move the arm portions from the first position to the second position.

In the first position the arm portions prevent movement of the needle carrier 205 in a direction that causes movement of the seal portion 204 from the first position to the second position. In the second position the arm portions do not prevent movement of the needle carrier 205 in a direction that causes movement of the seal portion 204 from the first position to the second position.

The needle carrier 205 includes a cylindrical body 213 within which the needle 206 is secured. The end of the body 213 is securable to (or in some embodiments is integral with) the seal portion 204 such that movement of the needle carrier 205 causes corresponding movement of the seal portion 204. The body 213 includes part way along its length a region 214 with a greater diameter than the rest of the body 213. This region 214 defines a disk-shaped region 214 of the body 213. This region 214 is shaped such that it contacts the abutment surfaces of the arm portions when the arm portions are in the first position (and does not contact the arm portions when the arm portions are in the second position).

Thus, movement of the needle carrier 205 in the direction of the seal portion 204 (i.e. to actuate the seal) is prevented until a suitably shaped object e.g. a fluid carrier with an appropriately shaped and pierceable base, moves the arm portions from the first to the second position.

The needle guard 207 includes a body 215 including a central aperture that extends through the body 215. The aperture is shaped to receive the housing seal portion 208. The housing seal portion 208 is a resealable substantially fluid impermeable seal. The needle guard 207 is also referred to herein as a housing.

The needle guard 207 also includes an annular wall surrounding the central aperture. The annular wall is shaped to fit with the end of the needle carrier 205 furthest from the base 201.

The needle guard 207 is moveable between a first position and a second position. In the first position, the needle guard 207 entirely encloses the end of the needle 206 furthest from the base 201. In this position, a user cannot come into physical contact with the needle 206. In the second position (that is, when the needle guard 207 has been displaced from the first position towards the base 201), the end of the needle 206 extends out of the central aperture of the needle guard 207 (through the housing seal portion 208). In this position, the needle 206 is exposed and can be used to pierce and draw fluid from other objects. However, in the preferred embodiment there is a beaded interface that prevents the user from exposing the needle 206 and then removing the object that has been used to actuate the movement, e.g. a fluid vessel.

The needle guard 207 includes a plurality of arm portions extending outwardly from the body 215 including first arm portion 216. In certain embodiments, the needle guard 207 includes three arm portions. The arm portions may include hooked lower portions or feet.

The needle guard 207 has a first configuration and a second configuration. In the first configuration, the arm portions are located in a first position, and in the second configuration, the arm portions are located in a second position. The arm portions are mechanically biased towards the first position and are moveable towards the second position, for example when interfacing with a fluid vessel e.g. a specimen container.

The arm portions are shaped such that in the first position they contact an abutment surface. In certain embodiments, the abutment surface is a surface of the annular wall of the housing 211. In some embodiments the end of at least one arm portion of the needle guard 207 is shaped as a hook or feet that can hook under body 203. The feet on the needle guard act as a ‘wedge’ between the shroud 209 and the body. Longitudinal grooves in the needle guard can be included to prevent rotation of the needle guard during use. The feet also ensure that the needle guard returns to a position wherein the needle is covered when the fluid vessel that has been used to actuate the interface is removed.

The interface is arranged such that the initial force that is required to be applied in order to move the needle guard arms is greater than the subsequent forces required to move the needle etc. This ensures that the entire process is viewed and experienced by the user as a single push which cannot be stopped part way, which in turn ensures accurate dosing and reliability. As the distances are relatively small e.g. stroke length from the bottom of the seal to the cassette is approx. 5 mm, then it would be extremely difficult for a user to apply sufficient pressure to move the needle guard arms without then completing the entire process.

The arm portions 216 include a first region and a second region separated by a stepped region. The arm portions 216 also include an abutment region adjacent to the second region. The first region is shaped to interact with a surface of a fluid container to move the arm portions from the first position to the second position. In this embodiment the first region is substantially cylindrical and is resiliently biased to slope downwards and outwards. However, when a sleeve or cylindrical end of a fluid container interacts with the portion this results in the arms 216 being drawn in as the wall of the sleeve slidably interacts with the smooth inclined outer surface of the first region. The abutment region is shaped to interact with the annular wall of the housing 211 when in the first position.

In the first position, the ends of the arm portions 216 furthest from the body 215 (typically the abutment region) extend further away from the longitudinal axis of the body

215 than in the second position. Effectively, in the second position the arm portions are "squeezed" in relative to the first position or drawn radially inwards towards the longitudinal axis of the body.

When the arm portions are in the first position, movement of the needle guard 207 in the direction of the base 201 is prevented as the splayed arms of the needle guard securely interface with a portion of the housing. Thus, movement of the needle guard 207 in a direction that causes the needle 206 to extend out from the needle guard 207 is prevented until a suitably shaped object is used to move the arm portions from the first to the second position. In the second position, the arms of the needle guard are moved such that they no longer interface with the portion of the housing and the needle guard can move downwards. The needle is not at this point moving as region 214 of the body 203 is shaped such that it contacts second arm portions 212 of the body 203

The shroud 209 (which is also referred to herein as an outer housing) includes an annular wall 217. An inner surface of the annular wall 217 is shaped to interact with the annular wall of the body 203 to secure the shroud 209 to the body 203 in a first position, moveable to a second position as described in more detail below.

The annular wall 217 extends around and encloses the other parts of the interface 200.

The shroud 209 is moveable in the direction of the base 201 between a shroud first position and a shroud second position. Movement typically occurs on contact with an abutment surface 410 of a fluid container 407. However, as the shroud 209 has an inner wall which rests on the arms 216 of the needle guard 207, the shroud can itself only move once the arms 216 of the needle guard are in their secondary position, therefore it cannot be moved until the drawing in of the arms 216 of the needle guard 207 has occurred. In the shroud first position, the shroud prevents any downward movement of the needle carrier 205 or needle guard 207 with respect to the base 201. Whilst the shroud is in the first shroud position, the body 203 is still in the first configuration, which prevents movement of the needle carrier 205. However, once the needle guard has been moved from its first position by drawing the arms 216 inwards, the movement of the needle guard 207 towards the base 201 causes the needle 206 which at this stage has no movement, to contact the needle guard 207, with continued downward translation of the needle guard resulting in an end of the needle 206 moving through the needle guard seal 208 and the specimen container seal 409, and into the specimen reservoir 408 due to the movement of said seals 208 and 409. The arms 212 of the body 203 are then urged outwards by the fluid container 407 such that the movement of the needle carrier 205 is no longer prevented. The shroud 209 and the needle carrier 205 are then able to move, with the movement of the needle carrier actuating movement of the seal portion within the reservoir such that the volume of the reservoir increases and simultaneously draws fluid through the needle into the reservoir.

When the shroud moves to the shroud second position, it is arranged to remain in the second position once it has been moved into this position. The inside surface of the bottom of the outer wall of the shroud 209 is provided with a snap-fit arm feature, comprising a rim that is shaped to interact with an undercut type feature on the body. This allows the shroud 209 to move downwards along the smooth outer surface and then, as the outer wall of the shroud 209 is resiliently biased, it will cause the bottom of the shroud to snap fit to the body 203 preventing upwards movement after this point. This ensures that the shroud does not pull upwards when the fluid container 407 is ultimately removed. To remove the fluid container, the user simply pulls upwards. The fluid container 407 is shaped to interact with the upper surface of the needle guard 207 via a bead or male/female type interaction. This upward force draws the needle guard 207 upward as the fluid container 407 is removed, until the arms of the needle guard—which are resiliently biased to return to their splayed position, contact the underside of the inner wall 209A of the shroud 209. At this point the needle guard can no longer move further upwards, but has moved sufficiently that the needle is no longer extending above the needle guard seal 208. Further upward pulling by the user causes the fluid container 407 to disengage from the needle guard 207 such that it can be completely removed. In a preferred embodiment the needle guard cannot then be pushed back down to re-expose the needle as the arms 216 splay out in a manner that means they will sit on top of one or more upstands 219 extending from the base 201. However, the vessel 407 can be used with another interface in the same way e.g. to allow another test to be carried out on another aliquot of the same sample.

To assemble the interface 200 into a ready to use configuration, the base 201 is secured to (or in certain embodiments integrally formed with) a microfluidic cassette. The seal portion 204 and spacer 202 are located inside the base 201 to form a reservoir. The needle 206 is secured to the needle carrier 205 and the needle carrier 205 is secured to the seal portion 204. The body 203 is secured to the base 201. The seal 208 is located within the aperture of the needle guard 207 and the needle guard 207 is located above the needle carrier 205. The shroud 209 is secured to the body 203 to enclose the remainder of the interface 200.

Figure 3A:
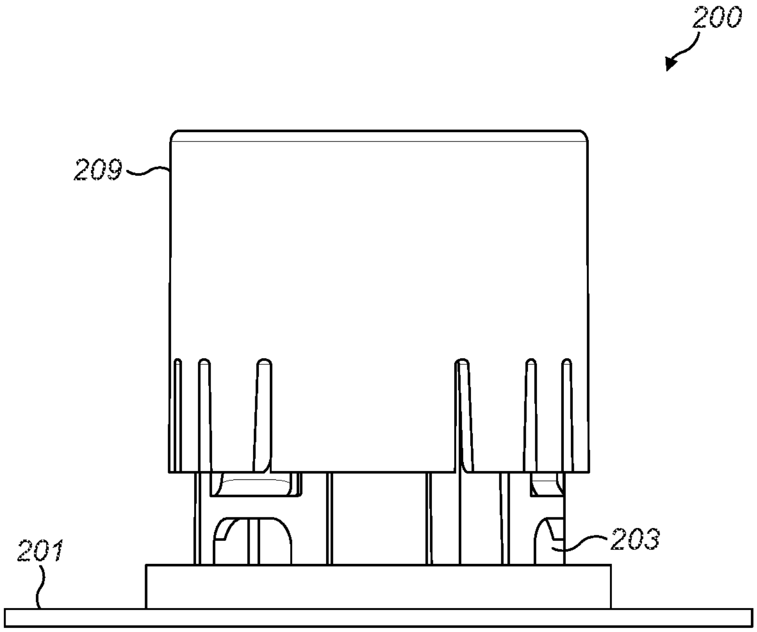
FIG. 3*a* shows the interface of FIG. 2 in a first configuration.
Figure 3B:
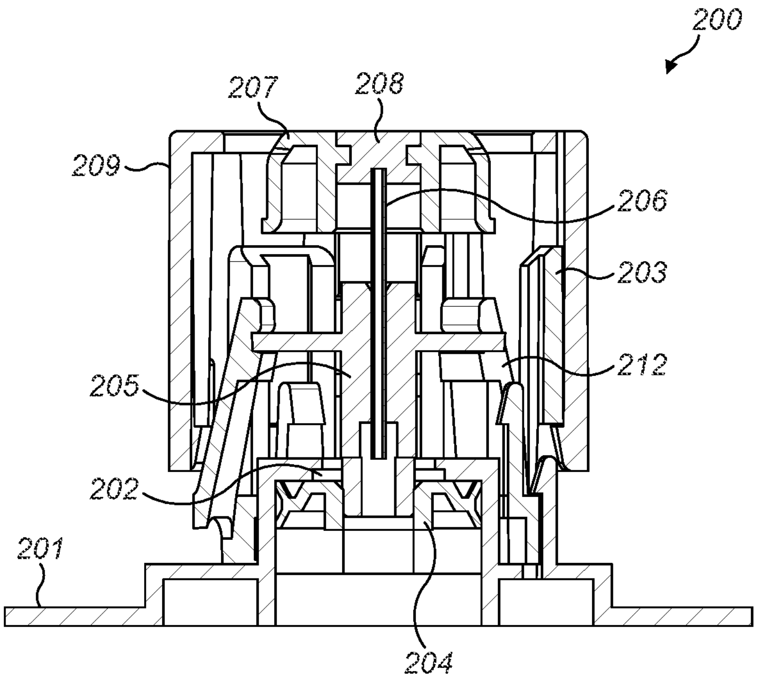
FIG. 3*b* shows a cross section of the interface of FIG. 2.

FIG. 3*a* shows a side view of the interface 200 that was described with reference to FIG. 2 assembled into a ready to use configuration. FIG. 3*b* shows the same view as FIG. 3*a* in cross section.

As shown in FIG. 3*b*, in the ready to use configuration, the seal portion 204 is located adjacent to the end of the reservoir (in the first position). The needle 206 is in fluid communication with the reservoir. The body 203 is in the first configuration such that the arm portions of the body 203 are in contact with the disk-shaped region of the needle carrier 205. The needle guard 207 encloses the needle 206. The needle guard 207 is in the first configuration such that the arm portions of the needle guard 207 (which are only partially shown in FIG. 3*b*) are in contact with a surface of the body 203. The shroud 209 encloses the interface 200 in a first position.

Figure 4:
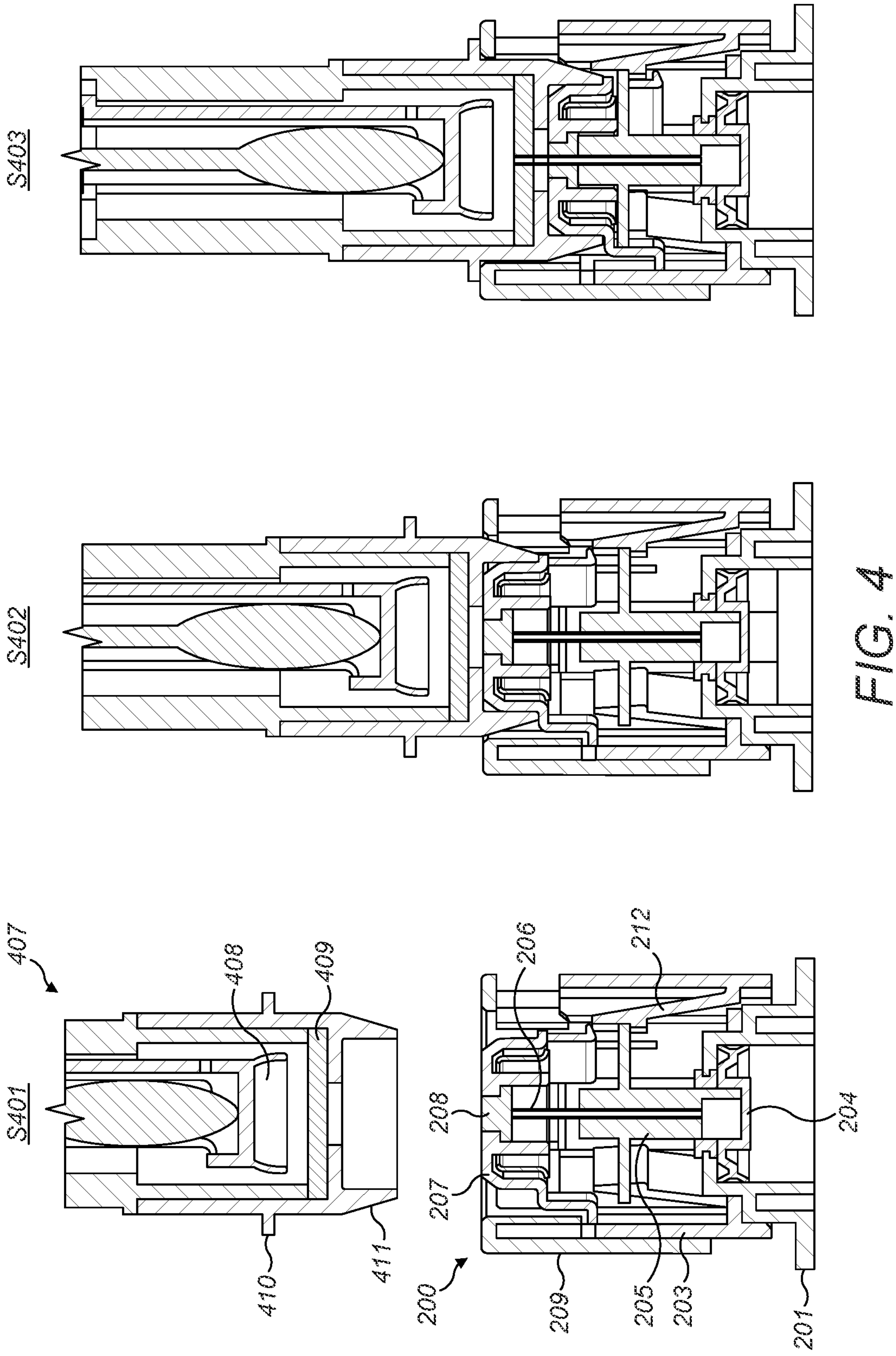
FIG. 4 shows the interface of FIG. 2 at different stages during interaction with a fluid container.
Figure 4:
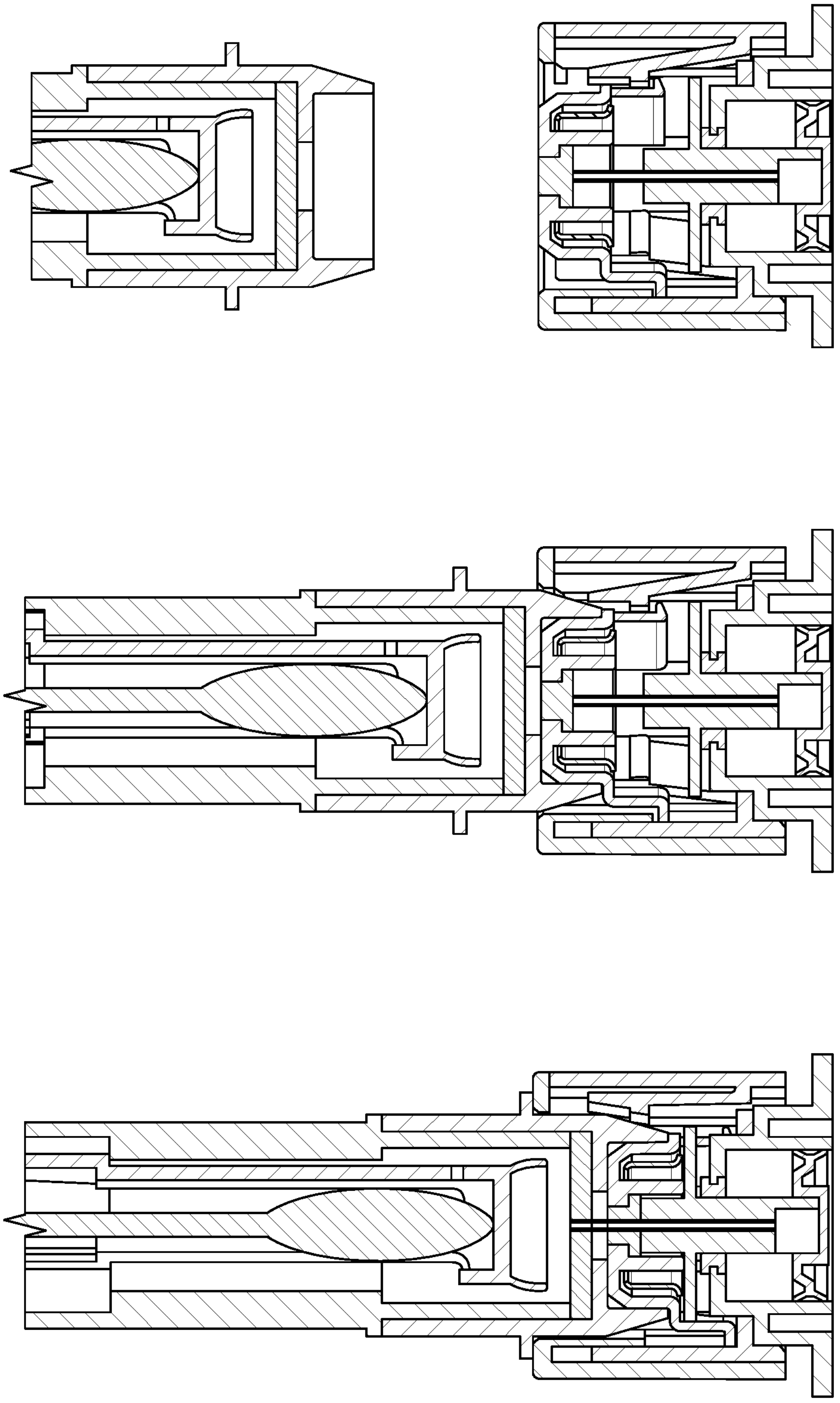

FIG. 4 shows the interface 200 described with reference to FIG. 2 as it interacts with a fluid container. Typically, as depicted in FIG. 4, the fluid container is a specimen container 407 that is designed to interact with the interface 200. The lower end of the specimen container 407 has a pierceable portion, as well as a lower portion that is specifically shaped to physically draw in the arm portions of the needle guard. The specimen container 407 also has an abutment surface to interface and push down the shroud, as further described below. For ease of viewing, reference signs have not been included for steps S402-S406.

The specimen container 407 includes a specimen reservoir 408. The reservoir 408 contains a fluid specimen for introducing into a microfluidic cassette for diagnostic testing. The reservoir 408 is sealed by a pierceable seal 409. An outer surface of the container 407 includes an abutment surface 410. The container 407 also includes an annular wall

411 surrounding part of the reservoir 408. The annular wall 411 is shaped to interact with the interface 200 as described below.

At step S401, the interface 200 is in the ready to use configuration described with reference to FIGS. 3*a* and 3*b*. The needle guard 207 and the body 203 are both in the first configuration. Movement of the needle guard 207 and the needle carrier 205 towards the base 201 is therefore prevented as the arms 212 of the body 203 are biased inwards such that they physically block the downward movement of the needle guard. As a result, even if a user manually applies a force to the exposed components of the interface 200 without an appropriately shaped interfacing device, the needle 206 will remain enclosed by the needle guard 207 and the seal portion 204 will remain in the first position. The user is therefore prevented from accidentally exposing the needle 206 or actuating the seal portion 204.

At step S402, the container 407 has been moved towards and has made contact with the interface 200. The annular wall 411 of the container 407 has made contact with a surface of the needle guard 207 and as a result has moved the needle guard 207 into the second configuration where the arms 216 are drawn inwards. The needle guard 207 is shaped to precisely receive the annular wall 411 of the container such that accidental drawing in of the arms 216 are prevented as it requires a tool that is shaped appropriately e.g. it may be sleeve shaped to fit over the needle guard but within the shroud. In the second configuration movement of the needle guard 207 towards the base 201 is no longer prevented.

At step S403, the container 407 has moved further towards the base 201. The movement of the container 407 has also moved the needle guard 207 towards the base 201. Because the body 203 is still in its first configuration, which prevents movement of the needle carrier 205, the movement of the needle guard 207 towards the base 201 causes the needle 206 to extend out of the needle guard 207, through the needle guard seal 208 and the specimen container seal 409, and into the specimen reservoir 408. As the needle 206 passes through the seals, some debris on the outside surface of the needle 206 may be removed.

Also, at step S203, the abutment surface 410 of the container 407, which extends outward as a collar with a wider circumference than the shroud, has made contact with the shroud 209.

At step S404, the specimen container 407 has moved further towards the base 201. The annular wall 211 of the specimen container 407 has made contact with the arm portions of the body 203 and has thereby moved the body 203 into the second configuration. As a result, movement of the needle carrier 205 towards the base 201 is no longer prevented by the arm portions of the body 203 and the needle carrier 205 has also moved towards the base 201.

Movement of the needle carrier 205 towards the base 201 has caused the seal portion 204 to move into the second position. As the seal portion 204 has moved from the first to second position, the volume of the reservoir has increased. This results in a lowering of pressure within the reservoir which acts to draw in fluid. Fluid has been drawn through the needle from the specimen container 407 into the reservoir. At step S404, a predetermined volume of fluid has been drawn into the reservoir.

Also, at step S404, movement of the abutment surface 410 against the shroud 209 has caused the shroud 209 to move towards the base 201 into the second position in which further movement of the shroud 209 is no longer possible.

At step S405, the specimen container 407 has moved away from the interface 200. As a result of the mating contact between a bead (not shown) on the annular wall 411 and a corresponding ingress (not shown) on the needle guard 207, the movement upwards of the specimen container 407 has caused corresponding movement of the needle guard 207. The needle guard 207 now encloses the needle 206. The shroud 209 remains in the second position closer to the base 201 due to the snap-fit portion interacting with an undercut on the body 203. As the shroud 209 is held in this second position it prevents the needle guard from being pulled out of the interface 200 when the specimen container 407 is removed.

At step S406, the specimen container 407 is no longer in contact with the interface 200. The interface 200 is in a used configuration in which further contact with a specimen container 407 will not actuate the seal portion 204. The shroud 209 remains in the second position closer to the base 201 providing a visual indication that the interface 200 has been used.

After step S406, the metered volume of fluid contained in the reservoir can be introduced into a channel of microfluidic cassette for further actions such as diagnostic testing.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

What is claimed is:

1. An interface for a microfluidic device, the interface comprising:

a seal portion configured to be moved from a first position to a second position within a reservoir in response to an applied force, movement of the seal portion within the reservoir causing the volume of said reservoir to increase;

a hollow needle comprising a first end and a second end, said first end locatable in fluid communication with the reservoir and said second end located outside of the reservoir and arranged for piercing, wherein the seal portion and the hollow needle are configured to draw a predetermined volume of fluid through the hollow needle when the seal portion moves from the first position to the second position, and a seal actuating member configured to move the seal portion from the first position to the second position within the reservoir, only in response to a force applied to the seal actuating member by a fluid container.

2. The interface of claim 1, wherein the needle is secured to the seal actuating member such that the needle moves with the seal actuating member.

3. The interface of claim 1, further comprising at least one arm portion moveable between a first position and a second position, wherein in the first position the arm portion prevents movement of the seal actuating member in a direction that causes movement of the seal portion from the first position to the second position.

4. The interface of claim 3, wherein in the second position the arm portion does not prevent movement of the seal actuating member in a direction that causes movement of the seal portion from the first position to the second position.

5. The interface of claim 3, wherein the arm portion is mechanically biased towards the first position.

6. The interface of claim 3, wherein the arm portion comprises at least one abutment surface arranged to interact with a surface of the seal actuating member in the first position.

7. The interface of claim 3, wherein the arm portion comprises at least one surface arranged to interact with a surface of a fluid container to move the arm portion from the first position to the second position.

8. The interface of claim 1, further comprising a housing moveable between a first position and a second position, wherein in the first position the second end of the needle is enclosed by the housing and in the second position the second end of the needle extends out of the housing.

9. The interface of claim 8, wherein the housing comprises a housing seal portion and wherein in the second position, the needle extends through the housing seal portion out of the housing.

10. The interface of claim 8, wherein the housing has a first configuration in which movement of the housing from the first position to the second position is prevented and second configuration in which movement of the housing from the first position to the second position is not prevented.

11. The interface of claim 10, wherein the housing is mechanically biased towards the first configuration.

12. The interface of claim 1, further comprising an outer housing enclosing the interface.

13. The interface of claim 12, wherein the outer housing restricts the movement of the seal actuating member in a direction away from the microfluidic device and is moveable from a first shroud position to a second shroud position, wherein in the second shroud position the movement of the seal actuating member in a direction away from the microfluidic device is such that, whilst some upwards movement is allowed, it is restricted from returning to its starting position.

14. The interface of claim 13, further comprising a seal actuating member arranged to move the seal portion from the first position to the second position within the reservoir, wherein the seal actuating member is arranged to move the seal portion from the first position to the second position only in response to a force applied to the seal actuating member by a fluid container, and wherein the outer housing is arranged to move from the first shroud position to the second shroud position on contact with the fluid container.

15. The interface of claim 1, wherein the interface is securable to or integrally formed with a microfluidic device such as a microfluidic cassette.

16. The interface of claim 1, further comprising a reservoir.

17. A microfluidic device comprising an interface of claim 1.

18. A microfluidic device of claim 17, wherein the microfluidic device is a microfluidic cassette.

19. A kit comprising an interface of claim 1 and a fluid container adapted to interact with said interface, wherein the interface is configured to directly or indirectly apply a force to the seal portion.

* * * * *